United States Patent
Tsukano

(10) Patent No.: US 11,748,049 B2
(45) Date of Patent: Sep. 5, 2023

(54) CONTROL APPARATUS, CONTROL METHOD, AND STORAGE MEDIUM THAT ASSOCIATE COLOR CONVERSION PARAMETER WITH JOB

(71) Applicant: Konica Minolta, Inc., Tokyo (JP)

(72) Inventor: Toshiki Tsukano, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/370,266

(22) Filed: Jul. 8, 2021

(65) Prior Publication Data

US 2022/0011993 A1   Jan. 13, 2022

(30) Foreign Application Priority Data

Jul. 10, 2020   (JP) ................................. 2020-118841

(51) Int. Cl.
   *G06F 3/12*   (2006.01)
(52) U.S. Cl.
   CPC .......... *G06F 3/1255* (2013.01); *G06F 3/1208* (2013.01)
(58) Field of Classification Search
   CPC ... G06F 3/1255; G06F 3/1208; H04N 1/0005; H04N 1/00023; H04N 1/00037; H04N 1/6008; H04N 1/6033; H04N 1/6038; H04N 2202/0094
   USPC ................................................. 358/1.9, 1.15
   See application file for complete search history.

(56) References Cited

U.S. PATENT DOCUMENTS

| | | | |
|---|---|---|---|
| 2004/0199355 A1* | 10/2004 | Jung ..................... | G06T 11/001 702/137 |
| 2005/0128498 A1* | 6/2005 | Matsuzaki ............. | H04N 1/603 358/1.9 |
| 2017/0318193 A1 | 11/2017 | Tsukano | |
| 2019/0197372 A1* | 6/2019 | Inada .................... | H04N 1/6033 |
| 2020/0183627 A1* | 6/2020 | Toriyabe ............ | G03G 15/5083 |
| 2022/0006921 A1* | 1/2022 | Tsukano ............... | H04N 1/6025 |

FOREIGN PATENT DOCUMENTS

| | | |
|---|---|---|
| EP | 2247092 A1 | 11/2010 |
| JP | 2016048900 A | 4/2016 |
| JP | 2020-010104 A | 1/2020 |
| JP | 2020010104 A * | 1/2020 |

OTHER PUBLICATIONS

Extended European Search Report issued in corresponding EP Application No. 21182032.9 dated Dec. 7, 2021 (6 pages).
Search Report issued in corresponding European Application No. 21182032.9; dated Mar. 2, 2023 (6 pages).

* cited by examiner

*Primary Examiner* — Kent Yip
(74) *Attorney, Agent, or Firm* — Osha Bergman Watanabe & Burton LLP

(57) ABSTRACT

A control apparatus includes a controller that obtains a first job associated with first document image data, obtains read image data of a color sample associated with the first document image data, generates a first color conversion parameter regarding a color conversion of the first document image data based on the first document image data and the read image data, and automatically associates the first color conversion parameter with the first job.

8 Claims, 9 Drawing Sheets

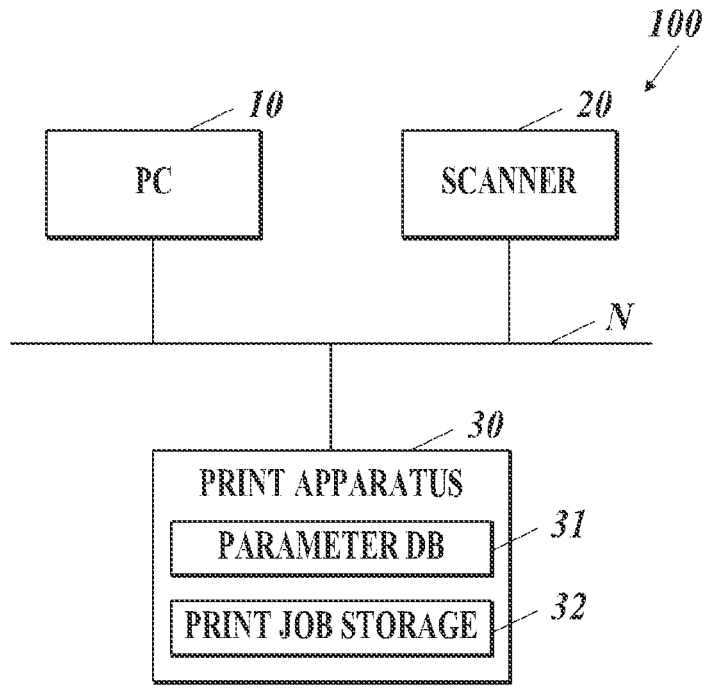
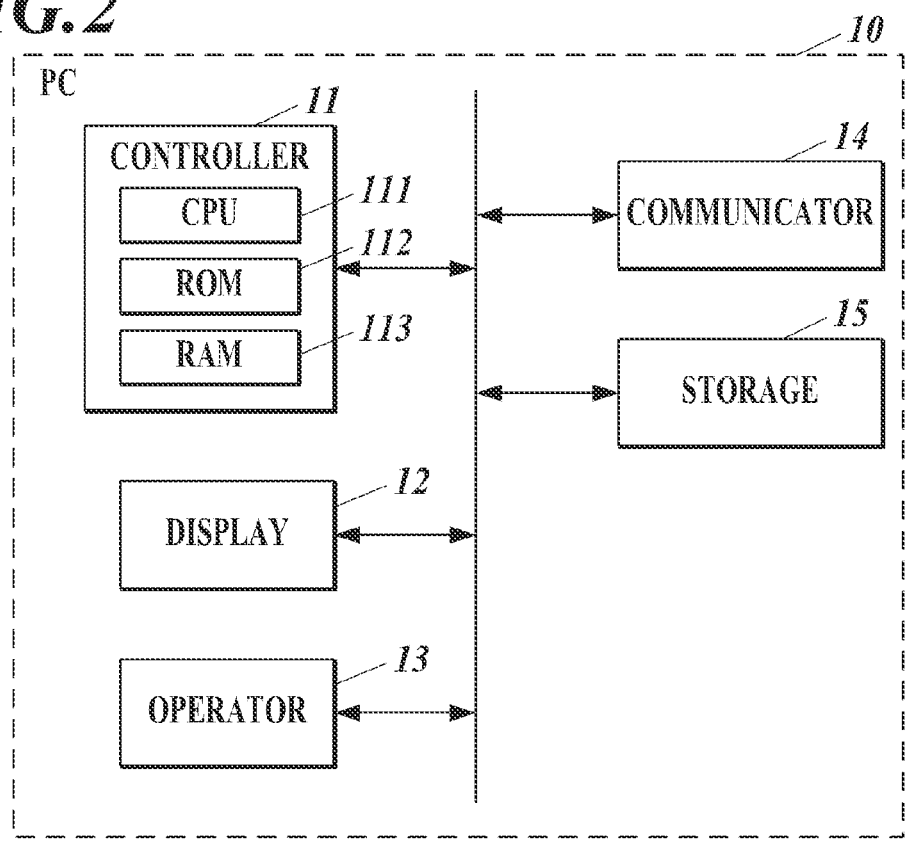

| No | FILE NAME | NUMBER OF PAGES | UPDATED DATE/TIME |
|---|---|---|---|
| 8612 | file1.pdf | 1 | 2020/01/31 16:00:02 |
| 6950 | file2.pdf | 1 | 2020/01/10 18:01:10 |
| 8832 | file3.pdf | 3 | 2019/12/20 20:23:36 |
| 8487 | file4.pdf | 1 | 2019/12/17 18:17:19 |
| 9336 | file5.pdf | 1 | 2019/12/13 15:17:16 |
| 9334 | file6.pdf | 1 | 2019/12/13 15:16:13 |
| 9316 | file7.pdf | 1 | 2019/12/13 14:47:51 |
| 9315 | file8.pdf | 1 | 2019/12/13 14:47:25 |
| 9310 | file9.pdf | 1 | 2019/12/13 14:43:12 |

FIG.12

| No. | JOB NAME | UPDATED DATE/TIME | RECOMMEND |
|---|---|---|---|
| 1 | JOB1 | 2020/1/19 | ✓ |
| 2 | JOB2 | 2020/1/20 | |
| 3 | JOB3 | 2020/1/28 | ✓ |
| 4 | JOB4 | 2020/1/28 | |

START ADJUSTMENT

JOB LIST

ENTER

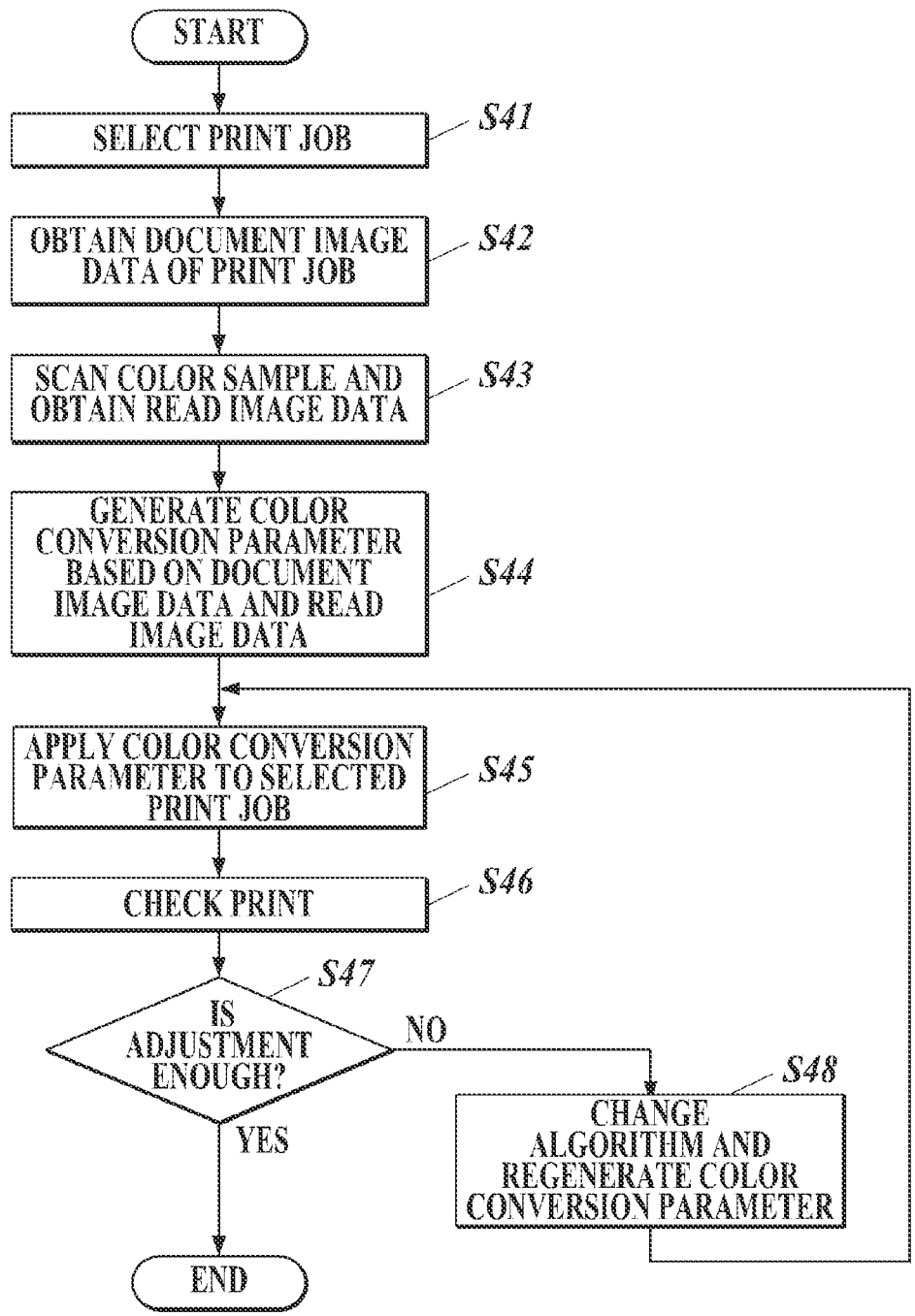

CONTROL APPARATUS, CONTROL METHOD, AND STORAGE MEDIUM THAT ASSOCIATE COLOR CONVERSION PARAMETER WITH JOB

CROSS-REFERENCE TO RELATED APPLICATIONS

The entire disclosure of Japanese Patent Application No. 2020-118841 filed on Jul. 10, 2020 is incorporated herein by reference.

BACKGROUND

Technical Field

The present invention relates to a control apparatus, a control method, and a storage medium.

Description of the Related Art

In stores where printing is performed, when the store receives an order to print based on document image data from a client, the store may receive an output product (color sample) as a target. In such situation, in order to reproduce a color in the color sample (target output), a color conversion table used in color conversion of the document image data is corrected from a relation of the colors between read image data (RGB value) obtained by reading the color sample and the document image data (CMYK value). With this, the color is matched (see Japanese Unexamined Patent Application Publication No. 2016-48900).

Specifically, software to create the color conversion parameter (ICC profile) is started, and the color sample is read by the scanner. Based on the read image data and the document image data, the color conversion parameter which reproduces the color closer to the color sample is created and the color conversion parameter is registered in a database.

Next, when the document image data is printed, a print application such as a printer driver is started, and a desired color conversion parameter is selected from the color conversion parameter registered in the database. With this, the color conversion parameter is corresponded to the document image data and the printing is performed.

However, according to the conventional technique, as a result of creating a new color conversion parameter each time the printing aiming for the color sample is performed, a huge number of color parameters are stored in the database. It follows that the user may select a color conversion parameter which is not desired by the user when the user instructs the printing to be performed.

SUMMARY

One or more embodiments of the present invention prevent selection of an undesired color conversion parameter.

According to one or more embodiments of the present invention, a control apparatus includes a controller, wherein the controller obtains a first job associated with (i.e., made to correspond to) first document image data; the controller obtains read image data of a color sample associated with the first document image data; the controller generates a first color conversion parameter regarding a color conversion of the first document image data based on the first document image data and the read image data; and the first color conversion parameter is automatically associated with the first job.

According to one or more embodiments, a control method executed by a controller of a control apparatus, the method comprising, obtaining a first job associated with first document image data; obtaining read image data of a color sample associated with the first document image data; generating a first color conversion parameter regarding a color conversion of the first document image data based on the first document image data and the read image data; and automatically associating the first color conversion parameter with the first job.

According to one or more embodiments, a non-transitory computer-readable storage medium storing a program causing a computer to perform as a controller, obtaining a first job associated with first document image data; obtaining read image data of a color sample associated with the first document image data; generating a first color conversion parameter regarding a color conversion of the first document image data based on the first document image data and the read image data; and automatically associating the first color conversion parameter with the first job.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 1 is a diagram showing a system configuration of a print system according to a first embodiment of the present invention;

FIG. 2 is a block diagram showing a functional configuration of a PC;

FIG. 12 is an example of a job list screen; and

FIG. 13 is a flowchart showing a fourth color conversion parameter generating process according to a fourth embodiment.

DETAILED DESCRIPTION OF EMBODIMENTS

Figure 3:
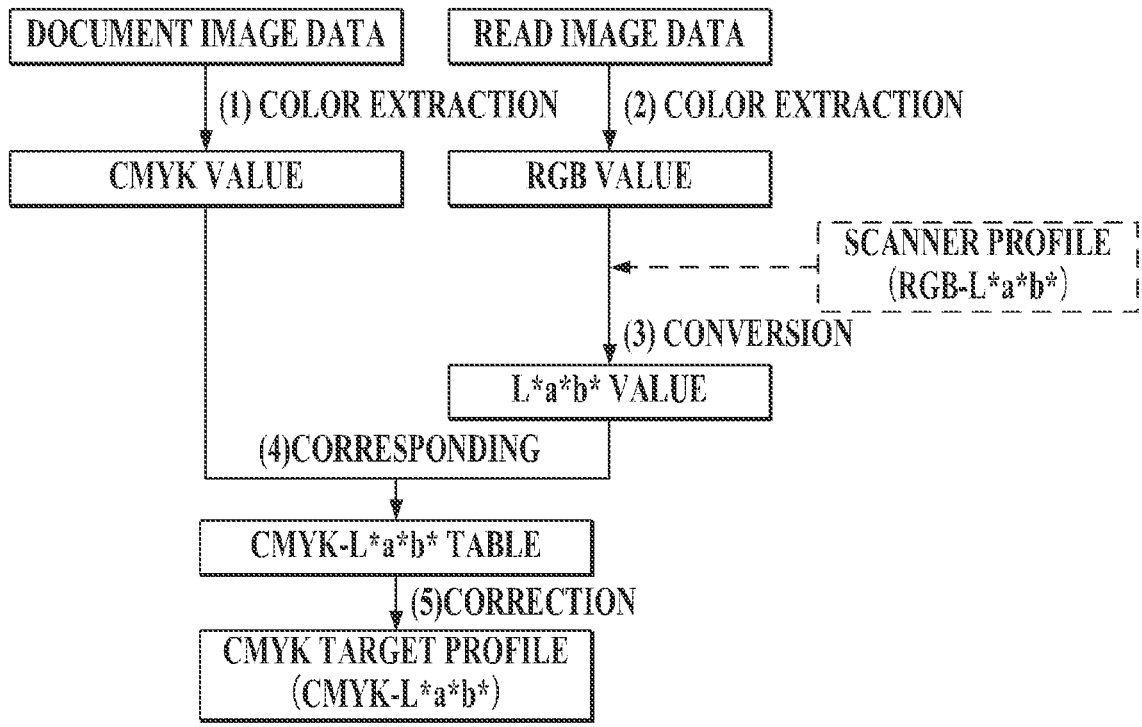
FIG. 3 is a diagram describing a flow of generating a color conversion parameter (target profile)

Hereinafter, embodiments of the present invention will be described with reference to the drawings. However, the scope of the invention is not limited to the disclosed embodiments.

Below, a control apparatus according to one or more embodiments of the present invention is described with reference to the drawings. However, the scope of the present invention is not limited by the illustrated examples.

First Embodiment

FIG. 1 shows a system configuration of a print system 100 according to a first embodiment. As shown in FIG. 1, the print system 100 includes a Personal Computer (PC) 10 as a control apparatus, a scanner 20, and a print apparatus 30. The apparatuses are connected to be able to communicate data through a communication network N such as a LAN (Local Area Network), etc. The print system 100 is provided in a print company, etc.

The PC 10 corrects a target profile when the color of the output from the print apparatus 30 is matched to the color of the color sample (target output), and a corrected result is provided to the print apparatus 30. The color sample is output received from a customer when the customer submits the document. This is not data but the actual output. The PC 10 transmits a print instruction including the image data to be printed to the print apparatus 30.

The scanner 20 reads the color sample and generates read image data (RGB value). As the scanner 20, a scanner provided in the print apparatus 30 can also be used.

The print apparatus 30 uses four process colors including cyan (C), magenta (M), yellow (Y), and black (K). Color materials such as toner, ink or the like in the colors CMYK are used to form an image on a sheet. The print apparatus 30 includes a controller and a printer engine. Based on the print instruction transmitted from the PC 10, the controller performs computing processes such as a color conversion process, a rasterizing process, a screening process, and the like on image data which is to be printed, and generates raster data (CMYK value).

The printer engine performs a printing process based on the raster data (CMYK value) generated by the controller.

The print apparatus 30 includes a parameter DB (DataBase) 31, and a print job storage 32.

A plurality of color conversion parameters (target profile) are registered in the parameter DB 31.

The print job storage 32 stores a print job printed by the print apparatus 30. The print job includes document image data which is the print target and job setting which shows how the printing is performed. The job setting includes information showing the color conversion parameter (target profile) used in the color conversion on the document image data, number of copies, magnification rate, post-processing setting, and the like.

FIG. 2 shows a functional configuration of the PC 10. As shown in FIG. 2, the PC 10 includes a controller 11, a display 12, an operator 13, a communicator 14, a storage 15, and the like.

The controller 11 includes a Central Processing Unit (CPU) 111, a Read Only Memory (ROM) 112, a Random Access Memory (RAM) 113, and the like. The controller 11 controls each unit in the PC 10. The CPU 111 reads various programs stored in the ROM 112 or the storage 15 and deploys the program in the RAM 113, and according to the deployed program, various processes are executed. The ROM 112 is a read only memory which stores various programs and various data. The RAM 113 functions as a work space and temporarily stores the programs and data.

The display 12 includes a monitor which is a Liquid Crystal Display (LCD) and the display 12 displays various screens according to an instruction of a display signal input from the controller 11.

The operator 13 includes a keyboard including cursor keys, letter input keys, various function keys, and the like and a pointing device such as a mouse. The operator 13 outputs to the controller 11 the operation signal input by the key operation on the keyboard and the mouse operation. The operator 13 may include a touch panel layered on the display 12, and the operation signal according to the position touched by the finger, etc. of the user can be output to the controller 11.

The communicator 14 includes a network interface and transmitting and receiving of data are performed with an external device connected through a communication network N.

The storage 15 is a storage apparatus which stores various programs and various data.

The storage 15 stores a color conversion profile. The color conversion profile is a profile used in color conversion, and includes a scanner profile, a printer profile, a target profile, and the like.

The scanner profile shows a relation between a read value (RGB value) by the scanner 20 and a color value ($L^*a^*b^*$ value) (read properties by the scanner 20).

The printer profile shows a relation between the image data (CMYK value) printed by the print apparatus 30 and the color value ($L^*a^*b^*$ value) (output properties of the print apparatus 30).

The target profile shows a relation between the document image data (CMYK value) input to a target printer which printed the color sample and the color value ($L^*a^*b^*$ value) obtained from the color sample. The target profile is updated by correction. The target profile does not always have to be stored in the storage 15, and the target profile can be obtained from the print apparatus 30 or newly generated when the target profile is used (corrected).

The controller 11 obtains the document image data (CMYK value) associated with (i.e., corresponding to) the color sample. The document image data is image data which is the source from which the color sample is printed, and data received from the customer. For example, a PDF file, a TIFF file, and the like are used as the document image data.

The controller 11 obtains from the scanner 20 the read image data (RGB value) obtained by reading the color sample. For example, the PDF file, the TIFF file, etc. are used as the read image data.

Based on the document image data and the read image data, the controller 11 generates the color conversion parameter (ICC profile) regarding the color conversion of the document image data. Specifically, the controller 11 generates the color conversion parameter of the target profile.

Next, with reference to FIG. 3, the flow of generating the color conversion parameter is described. Here, as the color conversion parameter, a CMYK target profile (CMYK source profile) is generated.

(1) CMYK values of the pixels are extracted from the document image data.

(2) The RGB value of each pixel is extracted from the read image data obtained by reading the color sample with the scanner 20.

(3) The CMYK target profile which is to be corrected is a look-up table (LUT) of CMYK-$L^*a^*b$. Therefore, the RGB value extracted from the read image data is converted to the $L^*a^*b^*$ value using the scanner profile (RGB-$L^*a^*b^*$ LUT).

(4) A table (CMYK-$L^*a^*b^*$ table) associated with the CMYK value with the $L^*a^*b^*$ value in the associated positions of the document image data and the read image data is created. Specifically, the feature point such as the edge (outline), corner, etc. is extracted from each of the document image data and the read image data, and the positioning of the document image data and the read image data is performed based on the feature point. For each position associated with each other, the combination of the CMYK value of the document image data and the L*a*b* value obtained from the read image data is stored in the CMYK-L*a*b* table.

(5) The correction is reflected on the CMYK target profile (CMYK-L*a*b*) (A7) based on the CMYK-L*a*b* table.

The RGB source profile is generated when the document image data is the RGB value.

The controller 11 obtains the first job associated with the first document image data (CMYK value) from the print apparatus 30.

Specifically, the controller 11 displays the plurality of jobs stored in the print job storage 32 of the print apparatus 30 as a list on the display 12, receives a selection of a first job from the plurality of jobs displayed as a list, and obtains the selected first job.

The controller 11 obtains the read image data of the color sample associated with the first document image data from the scanner 20.

The controller 11 generates the first color conversion parameter regarding the color conversion of the first document image data based on the first document image data and the read image data.

The controller 11 automatically associates the first color conversion parameter with the first job.

Next, the operation of the PC 10 is described.

Figure 4:
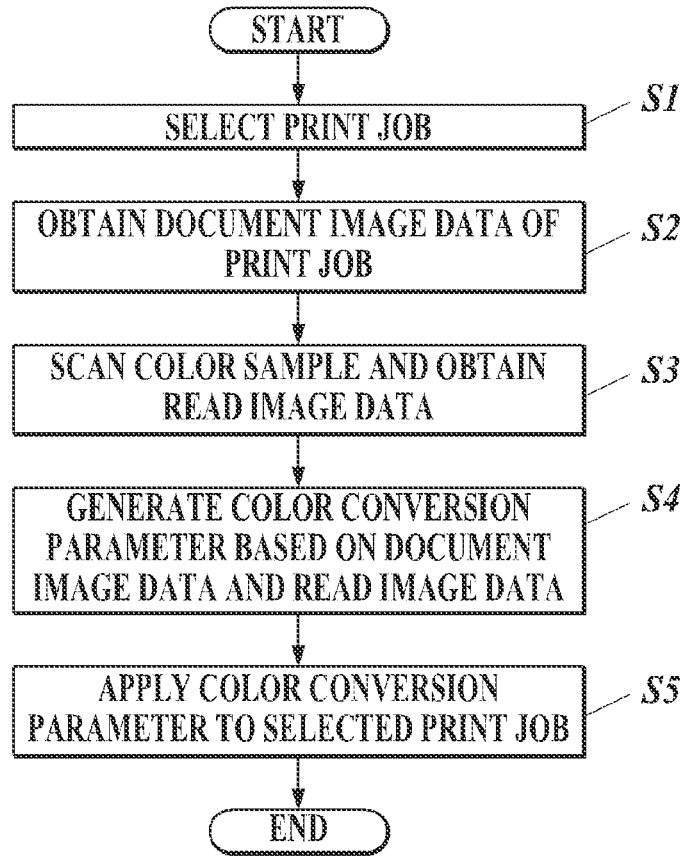
FIG. 4 is a flowchart showing a first color conversion parameter generating process.

FIG. 4 is a flowchart showing a first color conversion parameter generating process performed by the PC 10. This process is executed according to a software process by the CPU 111 of the controller 11 in coordination with the program stored in the storage 15.

First, through the communicator 14, the controller 11 displays as a list on the display 12 a plurality of print jobs stored in the print job storage 32 of the print apparatus 30.

Figures 5, 6:
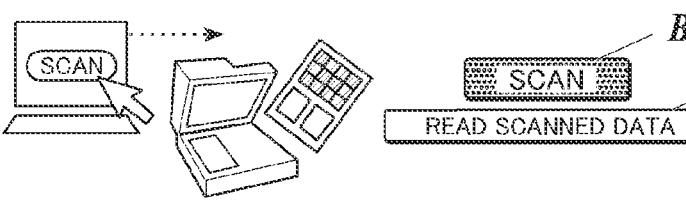
FIG. 5 is a diagram showing an example of a job list screen.
FIG. 6 is a diagram showing an example of a color sample scan screen.

FIG. 5 shows the example of the job list screen 121 displayed on the display 212. The job list screen 121 includes the job list display region 121A. A list of the print jobs is displayed on the job list display region 121A, and a job number, a file name (document image data), number of pages, and updated date/time are displayed for each print job.

The controller 11 receives a selection of the print job (first job) from the operator 13 by the user on the job list screen 121 (step S1). The user operates the operator 13 and selects the print job as the target of adjustment from the plurality of jobs displayed as the list. Through the communicator 14, the controller 11 obtains the selected print job from the print job storage 32 of the print apparatus 30. The controller 11 stores the selected print job in the storage 15.

Next, the controller 11 obtains the document image data (first document image data) (CMYK value) associated with the selected print job (step S2). The controller 11 stores the obtained document image data in the storage 15.

When the document image data includes a plurality of pages, the page used for adjustment is specified by the user.

Next, the controller 11 displays the color sample scan screen on the display 12.

FIG. 6 shows an example of the color sample scan screen 122 displayed on the display 12. The color sample scan screen 122 includes an operation guide region 122A, a scan button B1, a read button B2, and the like.

The operation guide region 122A displays the guide regarding the operation to scan the color sample.

The scan button B1 is a button to instruct the scanner 20 to execute the scanning of the color sample.

The read button B2 is a button to instruct reading of the read image data of the color sample scanned by the scanner 20.

When the user places the color sample on the scanner 20, and presses the scan button B1, the scanner 20 scans the color sample, and the read image data (RGB value) is generated. After the scanning is finished, when the user presses the read button B2, the controller 11 obtains the read image data (RGB value) from the scanner 20 through the communicator 14 (step S3). The controller 11 stores the obtained read image data in the storage 15.

Next, the controller 11 controls the display 12 and displays an adjustment screen.

Figure 7:
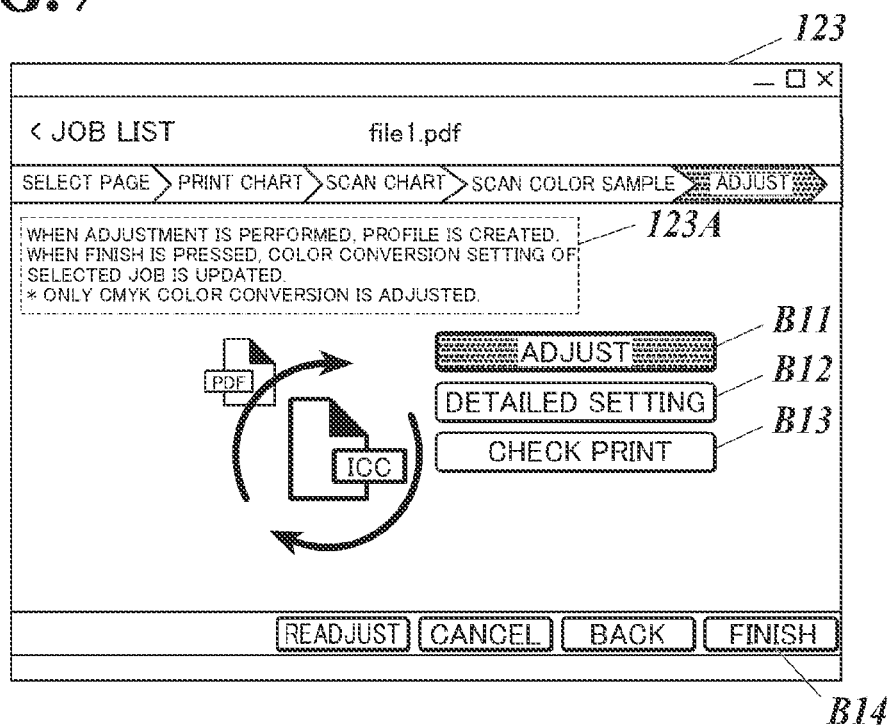
FIG. 7 is a diagram showing an example of an adjustment screen.

FIG. 7 shows an example of an adjustment screen 123 displayed on the display 12. The adjustment screen 123 includes an operation guide region 123A, an adjust button B11, a detailed setting button B12, a check print button B13, a finish button B14, and the like.

The operation guide region 123A displays a guide regarding the operation used in the adjustment (color matching).

The adjust button B11 is the button to instruct executing of the adjustment (creating a target profile).

The detailed setting button B12 is the button to perform the detailed setting regarding the adjustment.

The check print button B13 is the button to instruct check printing using the created target profile. According to such printing for the purpose of checking, it is possible to set the target profile, perform the printing, and check whether the desired color adjustment can be achieved before reflecting the correction of the target profile (color conversion parameter).

The finish button B14 is a button to instruct the created target profile to be applied to the selected print job.

When the user presses the adjust button B11, the controller 11 generates the color conversion parameter (target profile) regarding the color conversion on the document image data based on the document image data and the read image data (step S4). The method to correct the color conversion parameter (target profile) is described with reference to FIG. 3. The controller 11 stores the generated color conversion parameter in the storage 15.

The controller 11 transmits the generated color conversion parameter to the print apparatus 30 through the communicator 14. The color conversion parameter generated in the PC 10 is registered in the parameter DB 31 of the print apparatus 30.

Then, when the user presses the finish button B34, the controller 11 applies the color conversion parameter generated in step S4 to the print job selected in step S1 (step S5). Specifically, the controller 11 sets the color conversion parameter in the job setting of the print job and automatically associates the color conversion parameter with the print job.

In detail, the controller 11 transmits to the print apparatus 30 through the communicator 14 the corrected target profile (color conversion parameter) associated with the print job. In the print apparatus 30, the job setting (color conversion setting) of the print job is updated in the print job storage 32 in the state associated with the new color conversion parameter.

With this, the first color conversion parameter generating process ends.

When the print apparatus 30 performs the printing regarding the print job, the controller performs the color conversion from the document image data (CMYK value) to the color value (L*a*b* value) using the target profile associated with the print job. Then, the printer profile is used to perform color conversion from the color value (L*a*b* value) to the print image data (CMYK value). Then, the printer engine performs the printing based on the print image data (CMYK value). With this, the color aiming for the color sample can be achieved.

As described above, according to the first embodiment, the color conversion parameter is generated from the associated relation of the colors between the read image data obtained by reading the color sample (target output) and the color of the document image data associated with the color sample. The generated color conversion parameter is automatically associated with the print job associated with the document image data. With this, it is possible to prevent selection of undesired color conversion parameters for the print job, and the ease of operation can be enhanced.

In the job list screen 121 (see FIG. 5) displayed on the display 12 of the PC 10, the selection of the print job is received. In the color sample scan screen 122 (see FIG. 6), the instruction to execute the scanning of the color sample regarding the selected print job and the reading of the read image data is received. In the adjustment screen 123 (see FIG. 7), the instruction to execute the generating of the color conversion parameter (target profile) and the associating with the print job can be received. The user proceeds with the operation along the string of flow of the user interface provided by the PC 10. With this, it is possible to associate the color conversion parameter with the print job.

Conventionally, the color conversion parameter is created by software for creating the color conversion parameter, and then the color conversion parameter for the document image data is selected by the printer driver. According to the first embodiment, the generating of the color conversion parameter, and the associating with the print job can be performed with one string of processes, and the efficiency of work is enhanced.

Second Embodiment

Next, the second embodiment in which the present invention is applied is described.

The print system according to the second embodiment includes the same configuration as the print system 100 shown in the first embodiment. Therefore, FIG. 1 and FIG. 2 are referred, and the illustration and description of the configuration are omitted. Below, the configuration and process characteristic to the second embodiment are described.

When the color conversion parameter (target profile) registered in the parameter DB 31 of the print apparatus 30 is overwritten when corrected, the influence of the adjustment spreads to all print jobs in which this color conversion parameter is set. Therefore, it is necessary to manage the corrected color conversion parameter separately from the original color conversion parameter.

When the first color conversion parameter is generated based on the first document image data associated with the first job and the read image data of the color sample associated with the first document image data, the controller 11 registers the first color conversion parameter in the parameter DB 31 with a name different from the second color conversion parameter registered in advance in the database (parameter DB 31 of the print apparatus 30).

The controller 11 associates the first color conversion parameter registered in the parameter DB 31 with the first job.

The controller 11 determines whether the first color conversion parameter can be applied to the document image data other than the first document image data.

For example, the controller 11 determines whether the second document image data associated with the second job (job other than the first job) is similar to the first document image data. When the second document image data is similar to the first document image data, the controller 11 determines that the first color conversion parameter can be applied to the document image data other than the first document image data (second document image data).

When it is determined that the first color conversion parameter cannot be applied to the document image data other than the first document image data, the controller 11 prohibits the first color conversion parameter associated with the first job to be associated with other jobs other than the first job.

For example, when the setting screen of the color conversion parameter for another job is displayed on the display 12, the controller 11 prohibits the first color conversion parameter to be displayed as one option.

When the second document image data is similar to the first document image data, the controller 11 automatically associates the first color conversion parameter with the second job.

According to the second embodiment, prohibiting information can be added to the color conversion parameter registered in the parameter DB 31 of the print apparatus 30. The prohibiting information is information showing that the color conversion parameter is effective only for the generated document image data (print job), and it is prohibited to apply the color conversion parameter to other document image data (print job).

Next, the operation of the PC 10 according to the second embodiment is described.

Figure 8:
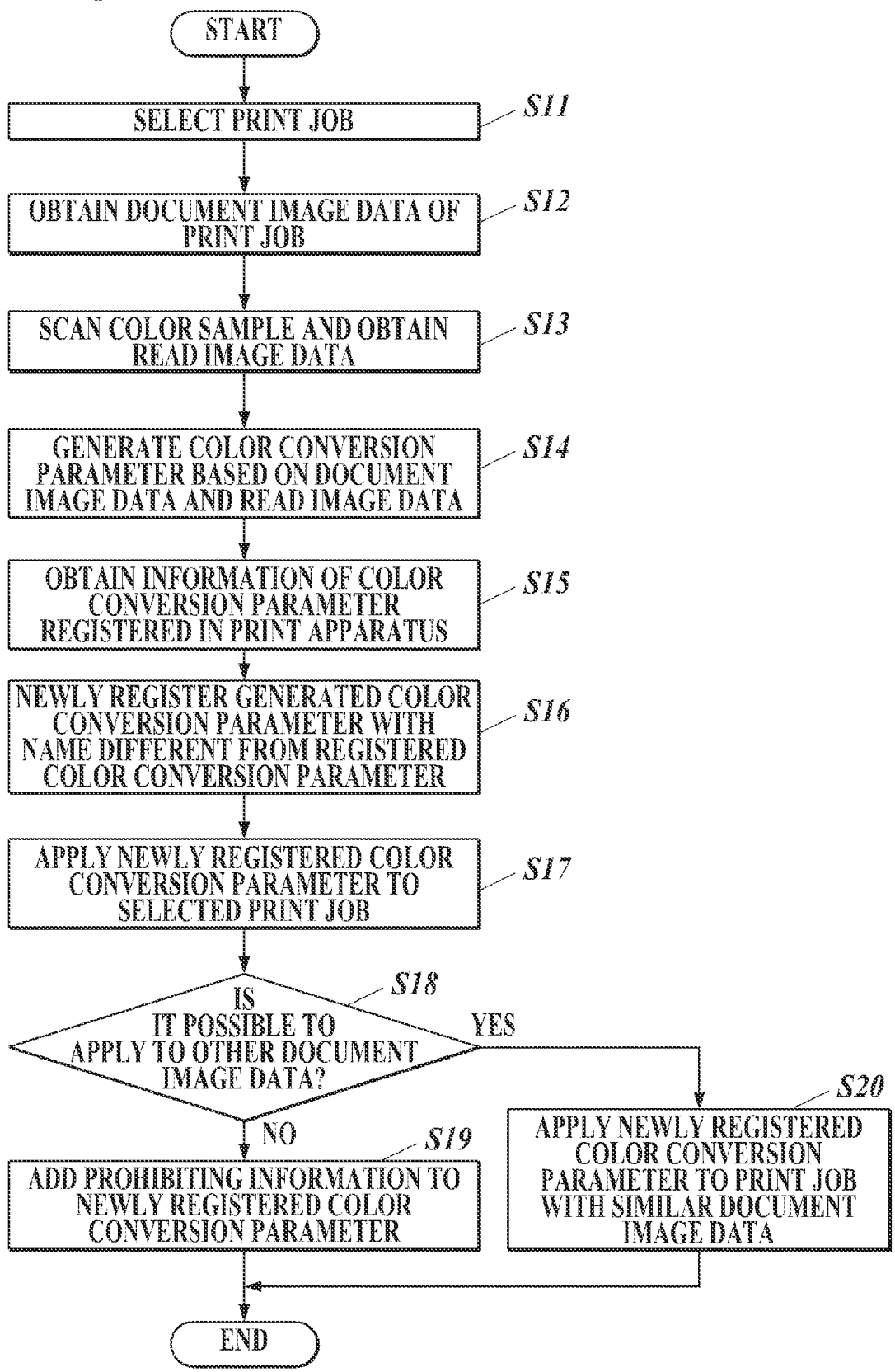
FIG. 8 is a flowchart showing a second color conversion parameter generating process according to a second embodiment.

FIG. 8 is a flowchart showing a second color conversion parameter generating process performed by the PC 10. This process is performed by a software process by the CPU 111 of the controller 11 in coordination with a program stored in the storage 15.

The processes in step S11 to step S14 are similar to the processes in step S1 to step S4 of the first color conversion parameter generating process (see FIG. 4), and therefore, the description is omitted.

After step S14, the controller 11 obtains the information of the color conversion parameter (profile name, etc.) registered in the parameter DB 31 of the print apparatus 30 through the communicator 14 (step S15).

Next, the controller 11 newly registers the generated color conversion parameter in the parameter DB 31 with a name different from the color conversion parameter (second color conversion parameter) registered in advance in the parameter DB 31 of the print apparatus 30 (step S16).

Specifically, the controller 11 adds to the generated color conversion parameter a name which is not a duplicate of the color conversion parameter already registered, and transmits the above to the print apparatus 30 through the communicator 14. The color conversion parameter generated in step S14 is registered in the parameter DB 31 of the print apparatus 30 using a name different from the color conversion parameter which is already registered.

Next, the controller 11 applies the color conversion parameter which is newly registered in the parameter DB 31 to the print job selected in step S11 (step S17). Specifically, the controller 11 sets the newly registered color conversion parameter to the job setting of the print job, and the newly registered color conversion parameter is automatically associated with the print job.

In more detail, the controller 11 transmits the corrected target profile (color conversion parameter) associated with the print job to the print apparatus 30 through the communicator 14. In the print job storage 32 of the print apparatus 30, the job setting (color conversion setting) of the print job is updated with the newly registered color conversion parameter associated with the job setting.

Next, the controller 11 determines whether the newly registered color conversion parameter can be applied to the document image data other than the document image data obtained in step S12 (step S18). For example, the controller 11 obtains a plurality of print jobs stored in the print job storage 32 of the print apparatus 30 through the communicator 14. The controller 11 determines whether the document image data (second document image data) associated with the other job (second job) other than the print job selected in step S11 is similar to the document image data obtained in step S12.

The degree of similarity of the jobs can be calculated by comparison of feature amounts using an open source such as AKAZE. For example, in a job in which the degree of similarity is high such as images of a cover of the same magazine and only the month is different, there is a high possibility that the desired color is the same. With this, it is determined that the adjusted color conversion parameter can be applied to the job with a high degree of similarity with the job as the target of adjustment.

Alternatively, it is possible to determine whether the newly registered color conversion parameter can be applied to the document image data other than the document image data obtained in step S12 from the distribution of the colors used in the image. When the image as the target of adjustment (document image data) and the distribution of the color of the image of another job (mapping to a histogram or a color space) are similar, it is possible to determine that the newly registered color conversion parameter can be applied to other jobs.

When the newly registered color conversion parameter cannot be applied to the document image data other than the document image data obtained in step S12 (step S18; NO), the controller 11 adds the prohibiting information to the color conversion parameter newly registered in the parameter DB 31 of the print apparatus 30 (step S19). That is, the controller 11 prohibits the newly registered color conversion parameter (first color conversion parameter) to be associated with the jobs other than the automatically associated print job (first job). The prohibiting information is added to the newly registered color conversion parameter in the parameter DB 31 of the print apparatus 30.

In step S18, when the newly registered color conversion parameter can be applied to the document image data other than the document image data obtained in step S12 (step S18; YES), that is, when there is document image data similar to the document image data obtained in step S12, the controller 11 applies the newly registered color conversion parameter to the print job with the document image data similar to the document image data obtained in step S12 (step S20). Specifically, the controller 11 sets the newly registered color conversion parameter in the job setting of the print job with the similar document image data, and with this, automatically associates the newly registered color conversion parameter with the print job. In the print job storage 32 of the print apparatus 30, the newly registered color conversion parameter is associated with (i.e., made to correspond to) the print job with the document image data similar to the document image data obtained in step S12.

After step S19 or step S20, the second color conversion parameter generating process ends.

Figure 9:
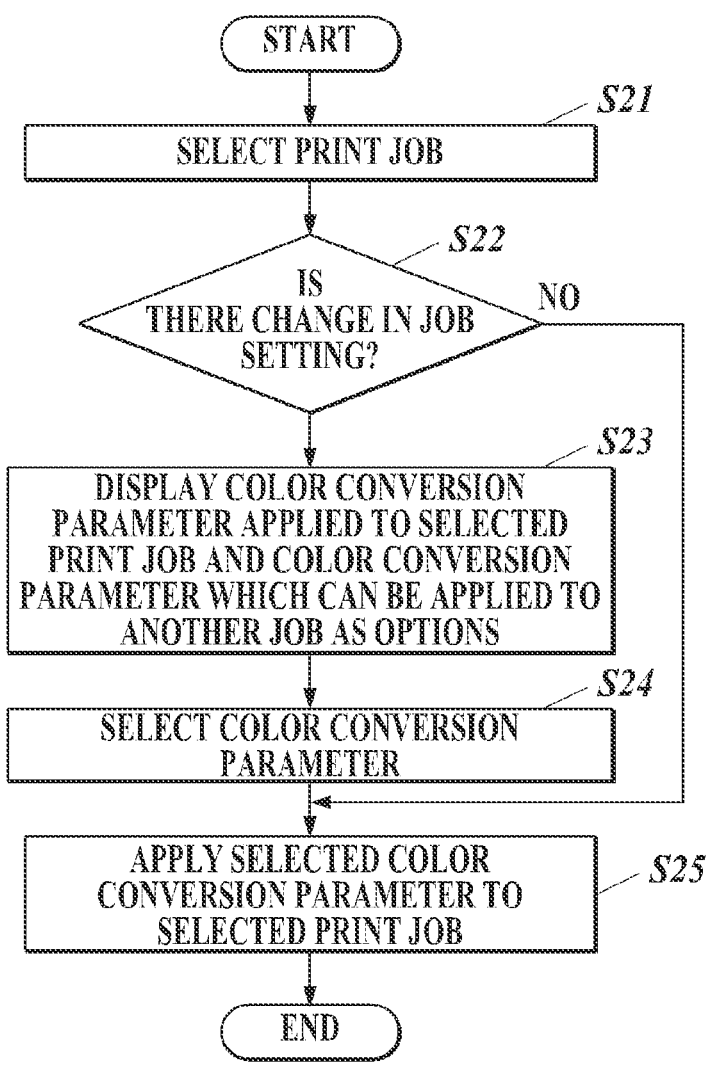
FIG. 9 is a flowchart showing a job setting change process.

FIG. 9 is a flowchart showing the job setting change process performed by the PC 10. The process is a software process performed by the CPU 111 of the controller 11 in coordination with the program stored in the storage 15.

First, the controller 11 displays the plurality of print jobs stored in the print job storage 32 of the print apparatus 30 as a list on the display 12 through the communicator 14.

Next, the controller 11 receives the selection of the print job by the user from the operator 13 (step S21). The user operates the operator 13 and selects any print job from the plurality of jobs displayed as a list.

Next, the controller 11 determines whether the job setting is changed in the selected print job (step S22). Specifically, the controller 11 determines whether the job setting is changed when there is an instruction to change the job setting of the selected print job by operation from the operator 13.

When the job setting is changed in the selected print job (step S22; YES), the controller 11 displays on the display 12 the color conversion parameter applied to the selected print job and the color conversion parameter which can be applied to another job as options (step S23).

Figure 10:
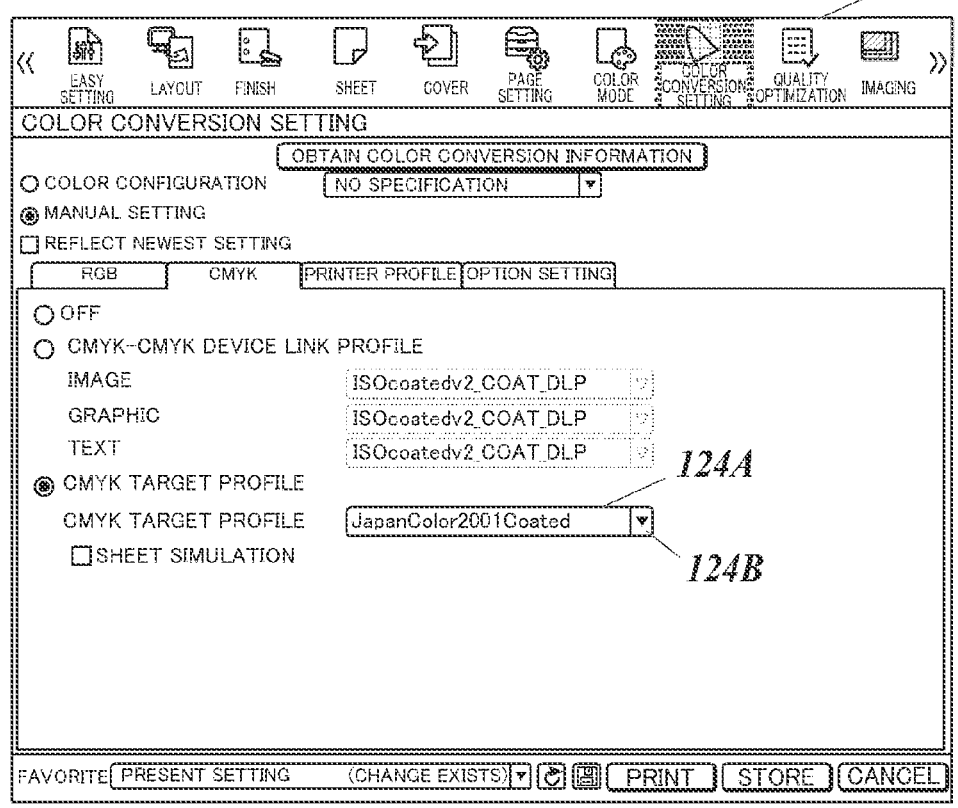
FIG. 10 is an example of a job setting screen.

FIG. 10 shows an example of the job setting screen 124 (setting screen of color conversion parameter) displayed on the display 12. The job setting screen 124 includes a CMYK target profile selecting region 124A and the like.

The target profile set at present for the selected print job is initially displayed in the CMYK target profile selecting region 124A from among the color conversion parameters (target profile) registered in the parameter DB 31 of the print apparatus 30. When a deploy button 124B is pressed by operating the operator 13, the target profile in which the prohibiting information is not added among the color conversion parameters registered in the parameter DB 31 is added as an option in the CMYK target profile selecting region 124A. That is, it is prohibited to display as an option the target profile in which the prohibiting information is added.

Next, in response to the operation on the operator 13 by the user, the controller 11 receives the selection of any color conversion parameter from the options (step S24). The color conversion parameter (target profile) is selected in the CMYK target profile selecting region 124A of the job setting screen 124, and the color conversion parameter can be set in the selected print job.

Next, the controller 11 applies the color conversion parameter selected in step S24 to the print job selected in step S21 (step S25). Specifically, the controller 11 sets the selected color conversion parameter in the job setting of the selected print job, and with this, the selected color conversion parameter is associated with the selected print job. The selected color conversion parameter is associated with the selected print job in the print job storage 32 of the print apparatus 30.

After step S25 or in step S22, when there is no change in the job setting in the selected print job (step S22; NO), the job setting change process ends.

As described above, according to the second embodiment, when the color conversion parameter is generated, the color conversion parameter is registered in the parameter DB 31 with a name different from the color conversion parameter registered in advance in the parameter DB 31 of the print apparatus 30. Therefore, it is possible to register the color conversion parameter without influencing the originally registered color conversion parameters and the print job associated with such color conversion parameters.

The prohibiting information is added when the color conversion parameter which cannot be applied to print jobs (document image data) other than the print job used when the color conversion parameter is generated is registered. Therefore, it is possible to show that the color conversion parameter is used temporarily.

The color conversion parameter in which the prohibiting information is added is not visible (not displayed) in the job setting screen 124 (see FIG. 10) in which the color conversion parameter is set. Therefore, such color conversion parameter is not selected by mistake.

In the job setting change process (see FIG. 9), the target profile in which the prohibiting information is added is not displayed as an option. Alternatively, it is possible to display such target profile as an option but to show that the selection is prohibited by displaying the target profile together with an icon or message showing in an understandable way that the selection of the target profile is prohibited.

Alternatively, it is possible to display the target profile with the prohibiting information added as an option and when the target profile with the prohibiting information added is selected, an error message may be displayed.

The generated color conversion parameter is basically applied to only the print job (document image data) used when the color conversion parameter is generated, but the generated color conversion parameter can be applied to other print jobs depending on the conditions.

For example, when the second document image data associated with the second job is similar to the first document image data used when the first color conversion parameter is generated, the first color conversion parameter can be automatically associated with the second job so that the setting of the color conversion parameter can be performed more efficiently.

Third Embodiment

Next, the third embodiment in which the present invention is applied is described.

The print system according to the third embodiment, includes the same configuration as the print system 100 shown in the first embodiment. Therefore, FIG. 1 and FIG. 2 are referred, and the illustration and description of the configuration are omitted. Below, the configuration and process characteristic to the third embodiment are described.

When the first color conversion parameter is generated based on the first document image data associated with the first job and the read image data of the color sample associated with the first document image data, the controller 11 is able to notify to the user another job to which the first conversion parameter can be applied other than the first job.

In response to receiving predetermined operation from the user, the controller 11 associates the first color conversion parameter with another job. That is, confirmation from the user is received before the first color conversion parameter is associated with another job.

Next, the operation of the PC 10 according to the third embodiment is described.

Figure 11:
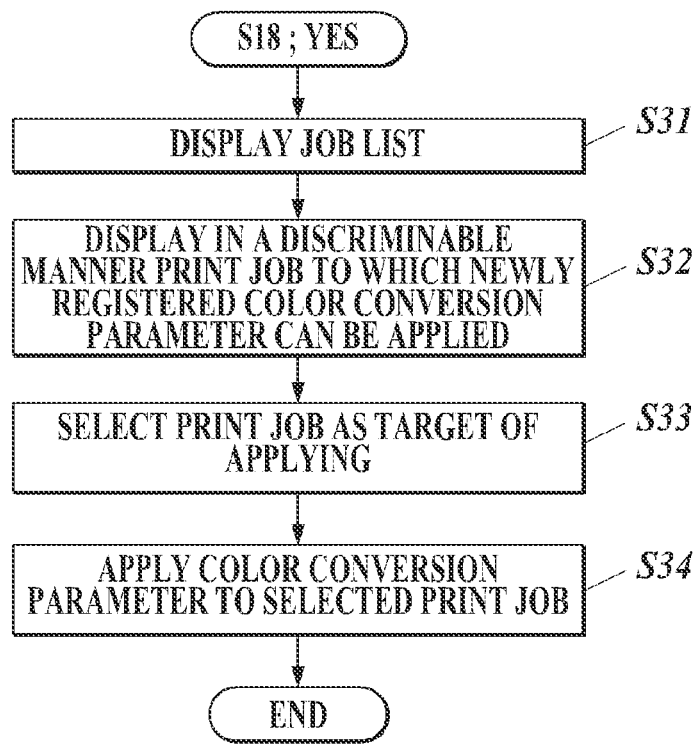
FIG. 11 is a flowchart showing an applied print job recommending process according to a third embodiment.

In the third color conversion parameter generating process according to the third embodiment, the process of step S20 in the second color conversion parameter generating process (see FIG. 8) shown in the second embodiment is replaced with the applied print job recommending process shown in FIG. 11. Therefore, the portions different from the second color conversion parameter generating process are described.

In step S18, when the newly registered color conversion parameter can be applied to the document image data other than the document image data obtained in step S12 (step S18; YES), the controller 11 displays on the display 12 the job list of the print job stored in the print job storage 32 of the print apparatus 30 (step S31).

In the job list, the controller 11 displays the print job to which the newly registered color conversion parameter can be applied in a form that can be discriminated on the job list (step S32).

FIG. 12 shows an example of the job list screen 125 displayed on the display 12. A job list display region 125A and an enter button B21 are included in the job list screen 125.

The information of all of the print jobs stored in the print job storage 32 of the print apparatus 30 is displayed in the job list display region 125A. Here, the job number, the job name, the updated date/time are displayed for each print job, and a recommend space is provided. Check boxes C1 to C4 are displayed associated with each print job in the recommend space. The check boxes C1 to C4 for the print jobs to which the newly registered color conversion parameter can be applied are displayed with a check. The check in the check boxes C1 to C4 can be changed by operation by the user.

The enter button B21 is a button to instruct to apply the color conversion parameter.

Next, the controller 11 receives the selection of the print job which is to be the target of applying the newly registered color conversion parameter by operation on the operator 13 by the user (step S33).

In the job list screen 125 shown in FIG. 12, the check remains (no operation) for the print job which is to be the target for applying the newly registered color conversion parameter among the print jobs in which there is a check in the check boxes C1 to C4 of the recommend space in the job list display region 125A. The check is unchecked for the print job to which the newly registered color conversion parameter is not applied among the print jobs with the check in the check boxes C1 to C4.

In the job list screen 125 shown in FIG. 12, when the enter button B21 is pressed, the controller 11 applies the newly registered color conversion parameter to the selected print job (step S34). Specifically, the controller 11 associates the color conversion parameter with the print job by setting the newly registered color conversion parameter to the job setting in the print job with a check in the check boxes C1 to C4 of the recommend space. The newly registered color conversion parameter is associated with the print job selected as the target of applying in the print job storage 32 of the print apparatus 30.

With this, the applied print job recommending process and the third color conversion parameter generating process ends.

As described above, according to the third embodiment, recommended print jobs are presented as the print job to which the newly registered color conversion parameter is applied, and the user interface in which the user is able to select whether to apply the color conversion parameter is prepared (job list screen 125 shown in FIG. 12). According to the third embodiment, the user provides confirmation before the newly registered color conversion parameter is applied to another job, and therefore, unintended association can be prevented.

Fourth Embodiment

Next, the fourth embodiment in which the present invention is applied is described.

The print system according to the fourth embodiment includes the same configuration as the print system 100 shown in the first embodiment. Therefore, FIG. 1 and FIG. 2 are referred, and the illustration and description of the configuration are omitted. Below, the configuration and process characteristic to the fourth embodiment are described.

After the first job is printed using the first color conversion parameter, the controller 11 generates the third color conversion parameter for the first job and automatically associates the third color conversion parameter with the first job.

Specifically, after the first job is printed using the first color conversion parameter, the controller 11 changes the setting of the algorithm used in generating the color conversion parameter based on the printed result, and generates the third color conversion parameter again.

Next, the operation of the PC 10 according to the fourth embodiment is described.

FIG. 13 is a flowchart showing the fourth color conversion parameter generating process performed by the PC 10. This process is a software process performed by the CPU 111 of the controller 11 in coordination with the program stored in the storage 15.

The process of steps S41 to step S45 are similar to the processes of steps S1 to S5 of the first color conversion parameter generating process (see FIG. 4), and the description is omitted.

After step S45, the controller 11 uses the newly generated color conversion parameter and controls the print apparatus 30 to perform the check printing (step S46).

Specifically, when the check print button B13 is pressed in the adjustment screen 123 shown in FIG. 7, the controller 11 instructs the print apparatus 30 to perform the print job using the adjusted color conversion parameter through the communicator 14. In the print apparatus 30, color conversion is performed from the document image data (CMYK value) to the color value (L*a*b* value) using the adjusted color conversion parameter (target profile), color conversion is performed from the color value (L*a*b* value) to the print image data (CMYK value) using the printer profile, and the printing is performed based on the print image data (CMYK value).

The user checks the printed result (output) and determines whether the adjustment is enough by sight. The user inputs by operation on the operator 13 whether the adjustment is enough. The controller 11 determines whether the adjustment is enough based on operation by the user (step S47).

When the adjustment is not enough (step S47; NO), the controller 11 changes the setting of the algorithm used when calculating the color conversion parameter (target profile) and regenerates the color conversion parameter (step S48). Examples of the setting of the algorithm include, adjustment of the correction level of the white color, setting of whether to show black by CMY or by K or the like. The change in the setting of the algorithm can be performed automatically or can be performed manually. The controller 11 stores the regenerated color conversion parameter in the storage 15.

The controller 11 transmits the regenerated color conversion parameter to the print apparatus 30 through the communicator 14. In the print apparatus 30, the color conversion parameter regenerated in the PC 10 is registered in the parameter DB 31.

After step S48, the process returns to step S45, and the process is repeated. In step S45, the color conversion parameter regenerated in step S48 is applied to the print job selected in step S41. Specifically, the controller 11 sets the regenerated color conversion parameter in the job setting of the print job. With this, the regenerated color conversion parameter is automatically associated with the print job. The regenerated color conversion parameter is associated with the selected print job in the print job storage 32 of the print apparatus 30.

In step S47, when the adjustment is enough (step S47; YES), the fourth color conversion parameter generating process ends.

The color conversion parameter which is determined that the adjustment is not enough and the association between such color conversion parameter and the print job do not remain in the print apparatus 30. Only the color conversion parameter which is determined that the adjustment is enough and the association between such color conversion parameter and print job are stored in the print apparatus 30.

As described above, according to the fourth embodiment, the color conversion parameter regenerated after the check printing can be automatically associated with the print job.

After the first adjustment is performed in step S44, the check printing (step S46) and the confirmation of the color is performed by the user. If it is determined that the adjustment is not enough (step S47; NO), the setting of the algorithm used when calculating the target profile is changed. With this, the target profile can be regenerated, and there is no need to obtain the document image data and the read image data again.

The above embodiments merely describe examples of the control apparatus, and the present invention is not limited to the above. The detailed configuration and the detailed operation of the units included in the apparatus can be suitably modified without leaving the scope of the present invention.

For example, the processes characteristic to one or more embodiments can be combined.

In the above embodiments, after the color conversion parameter is automatically associated with the print job, the print apparatus 30 can perform (print) the print job using the color conversion parameter. The data of the print job with which the color conversion parameter is associated can be output as data to the external apparatus, within the apparatus, or a storage medium.

In the above-described embodiments, the print system includes a PC 10 (control apparatus), a scanner 20, and a print apparatus 30 connected through a communication network N. Alternatively, the control apparatus, the scanner 20, and the print apparatus 30 can be directly connected physically. The functions to perform one or more embodiments can be divided to a plurality of apparatuses, or the functions can be included in one apparatus. For example, the print apparatus 30 and the scanner 20 can be formed as one, or the function to generate the color conversion parameter can be included in the print apparatus 30.

In the fourth color conversion parameter generating process according to the fourth embodiment (see FIG. 13), after it is determined that the adjustment is enough regarding the color conversion parameter (third color conversion parameter) regenerated in step S48 (step S47; YES), as described in the applied print job recommending process according to the third embodiment (see FIG. 11), the other jobs to which the regenerated color conversion parameter can be applied can be notified, and the regenerated color conversion parameter can be associated with another job by receiving the operation by the user.

The color system of the document image data (CMYK), the color system of the read image data (RGB) by the scanner 20, the color system of the color value (L*a*b*), the color system of the image data used when the printing is performed by the print apparatus 30 (CMYK), and the like are not limited to the above examples.

The computer readable medium which stores the program to execute the above processes is not limited to the above examples, and a portable storage medium such as a CD-ROM can be applied. As the medium providing the data of the program through communication lines, a carrier wave can be applied.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A control apparatus comprising:
a display; and
a central processing unit (CPU) that:
causes the display to display, on a screen, a list of jobs that are each capable of being set as a first job to generate a first color conversion parameter,
receives, via the screen, a selection of an adjustment target job, as the first job, from among the jobs in the list,
obtains first document image data associated with the first job,
obtains read image data of a color sample associated with the first document image data,
generates the first color conversion parameter regarding a color conversion of the first document image data based on the first document image data and the read image data,
automatically updates a setting of the first job by setting the first color conversion parameter in the first job,
adds prohibiting information to the first color conversion parameter to prohibit the first color conversion parameter from being associated with jobs other than the first job,
when setting a color conversion parameter for the first job, causes the display to display a setting screen where the first color conversion parameter is displayed as an option, and
when setting a color conversion parameter for the other jobs, causes the display to display the setting screen where the first color conversion parameter is not displayed as an option.

2. The control apparatus according to claim 1, wherein the CPU further:
registers the first color conversion parameter in a database with a name different from a second color conversion parameter registered in the database in advance.

3. The control apparatus according to claim 1, wherein the CPU further:
determines whether the first color conversion parameter can be applied to document image data other than the first document image data, and
when determining that the first color conversion parameter cannot be applied to the document image data other than the first document image data, prohibits the first color conversion parameter from being associated with the other jobs.

4. The control apparatus according to claim 1, wherein the CPU further:
determines whether second document image data associated with a second job is similar to the first document image data, and
when determining that the second document image data is similar to the first document image data, automatically associates the first color conversion parameter with the second job.

5. The control apparatus according to claim 1, wherein the CPU further:
notifies to a user another job that is not the first job and to which the first color conversion parameter can be applied, and
associates the first color conversion parameter with the notified job upon receiving a predetermined operation from the user.

6. The control apparatus according to claim 1, wherein the CPU further:
after the first job is printed using the first color conversion parameter, generates a third color conversion parameter regarding the first job; and
automatically associates the third color conversion parameter with the first job.

7. A control method executed by a control apparatus, the method comprising:
causing a display to display, on a screen, a list of jobs that are each capable of being set as a first job to generate a first color conversion parameter;
receiving, via the screen, a selection of an adjustment target job, as the first job, from among the jobs in the list;
obtaining first document image data associated with the first job;
obtaining read image data of a color sample associated with the first document image data;
generating the first color conversion parameter regarding a color conversion of the first document image data based on the first document image data and the read image data;
automatically updating a setting of the first job by setting the first color conversion parameter in the first job;
adding prohibiting information to the first color conversion parameter to prohibit the first color conversion parameter from being associated with jobs other than the first job;
when setting a color conversion parameter for the first job, causing the display to display a setting screen where the first color conversion parameter is displayed as an option; and
when setting a color conversion parameter for the other jobs, causing the display to display the setting screen where the first color conversion parameter is not displayed as an option.

8. A non-transitory computer-readable storage medium storing a program causing a computer to execute:
causing a display to display, on a screen, a list of jobs that are each capable of being set as a first job to generate a first color conversion parameter;
receiving, via the screen, a selection of an adjustment target job, as the first job, from among the jobs in the list;
obtaining first document image data associated with the first job;
obtaining read image data of a color sample associated with the first document image data;

generating the first color conversion parameter regarding a color conversion of the first document image data based on the first document image data and the read image data;
automatically updating a setting of the first job by setting the first color conversion parameter in the first job;
adding prohibiting information to the first color conversion parameter to prohibit the first color conversion parameter from being associated with jobs other than the first job;
when setting a color conversion parameter for the first job, causing the display to display a setting screen where the first color conversion parameter is displayed as an option; and
when setting a color conversion parameter for the other jobs, causing the display to display the setting screen where the first color conversion parameter is not displayed as an option.

* * * * *